United States Patent
Araki et al.

(10) Patent No.: US 10,408,711 B2
(45) Date of Patent: Sep. 10, 2019

(54) DATA PROCESSING METHOD AND DATA PROCESSING APPARATUS

(71) Applicant: Kobe Steel, Ltd., Hyogo (JP)

(72) Inventors: Kaname Araki, Kobe (JP); Eiji Takahashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 103 days.

(21) Appl. No.: 15/100,781

(22) PCT Filed: Oct. 10, 2014

(86) PCT No.: PCT/JP2014/077241
§ 371 (c)(1),
(2) Date: Jun. 1, 2016

(87) PCT Pub. No.: WO2015/083442
PCT Pub. Date: Jun. 11, 2015

(65) Prior Publication Data
US 2016/0299036 A1     Oct. 13, 2016

(30) Foreign Application Priority Data

Dec. 3, 2013  (JP) ................... 2013-249889

(51) Int. Cl.
*G01M 17/02* (2006.01)
*B60C 11/24* (2006.01)
*G01B 5/00* (2006.01)
*G01B 11/25* (2006.01)

(52) U.S. Cl.
CPC ......... *G01M 17/027* (2013.01); *B60C 11/246* (2013.01); *G01B 5/0025* (2013.01); *G01B 11/2522* (2013.01)

(58) Field of Classification Search
CPC .................................................. G01M 17/027
USPC .......................................................... 73/146
See application file for complete search history.

(56) References Cited

U.S. PATENT DOCUMENTS 8,284,393 B2 * 10/2012 Takahashi .............. G01B 11/25
356/237.1

OTHER PUBLICATIONS

International Search Report issued in PCT/JP2014/077241; dated Dec. 2, 2014.
Written Opinion issued in PCT/JP2014/077241; dated Dec. 2, 2014.

* cited by examiner

*Primary Examiner* — Peter J Macchiarolo
*Assistant Examiner* — Rodney T Frank
(74) *Attorney, Agent, or Firm* — Studebaker & Brackett PC

(57) ABSTRACT

A sample point extraction unit (323) extracts natural defect candidate portions by using sample points comprising height data for one line obtained by scanning once around the measurement surface of a tire surface. Natural defect candidate portions include natural defect portions and intentional irregularity portions, such as characters and patterns. A differentiation unit (325) stores, in advance, conditions characteristic of the shape of intentional irregularity portions formed on the measurement surface, and from among the natural defect candidate portions, excludes natural defect candidate portions that satisfy those conditions from the natural defect candidate portions. Due to this configuration, intentional irregularity portions are differentiated from natural defect portions.

4 Claims, 10 Drawing Sheets

DATA PROCESSING METHOD AND DATA PROCESSING APPARATUS

TECHNICAL FIELD

The present invention relates to a technology that treats a tread surface or a sidewall surface of a tire as a measurement surface, and evaluates a natural defect portion formed on the measurement surface.

BACKGROUND ART

A tire has a tread surface and a sidewall surface. Intentional irregularity portions such as characters and patterns are formed on these tire surfaces. However, an irregularity portion which should not be originally present (hereinafter, natural defect portion) may be formed. The natural defect portion is generated due to a rubber bonding condition etc. in a tire manufacturing process. The natural defect portion may be the cause of a breakdown such as a burst of the tire. Hence, in a final inspection process in tire manufacturing, the shape of a tire surface is measured in order to find the natural defect portion, in addition to measurement for a variation in repulsive force of the tire surface.

Since the intentional irregularity portion is formed on the tire surface, the natural defect portion formed on the tire surface cannot be correctly evaluated unless data indicative of the intentional irregularity portion is excluded from the shape data of the tire surface.

Therefore, for example, two technologies are suggested. First one is disclosed in PTL 1 and is as follows. The output waveform of detecting means for detecting an irregularity portion of a tire side portion is converted into discrete positional data f(i) per predetermined interval, and a smooth differential value F(i) at a designated position (i) is calculated. If the absolute value of the smooth differential value F(i) exceeds a predetermined threshold K, the positional data is judged as data of a mark stamped on the tire surface. If both rising positional data and falling positional data of a protruding part of a waveform are positional data caused by the mark, all positional data constituting the protruding part is replaced with the rising positional data of the protruding part. These operations are repeated and the irregularity arising from the mark is excluded from the waveform.

Second one is disclosed in PTL 2 and is as follows. The output data of an optical displacement meter is acquired for one round of a tire by a predetermined number of samplings. From the data, predetermined signal pattern components (three patterns including trapezoid, large ridge, and small ridge) corresponding to a raised character on the side wall of the tire is excluded.

CITATION LIST

Patent Literature

PTL 1: Japanese Unexamined Patent Application Publication No. 2004-156919 (Abstract)
PTL 2: Japanese Unexamined Patent Application Publication No. 62-232507 (Line 18 in upper left column to line 16 in lower left column on page 3)

SUMMARY OF INVENTION

It is desirable to further improve the technology of evaluating the natural defect portion on the tire surface by excluding data indicative of the intentional irregularity portion from the shape data of the tire surface.

An object of the present invention is to provide a technology of accurately evaluating a natural defect portion on a tire surface.

A data processing apparatus according to an aspect of the invention treats a tread surface or a sidewall surface of a tire as a measurement surface, and processes data indicative of a shape of the measurement surface to evaluate a natural defect portion formed on the measurement surface. The data processing apparatus includes a sample point extraction unit that executes extraction processing on height data for one line obtained by scanning the measurement surface with a shape sensor every constant sampling period, the extraction processing acquiring a continuous constant number of pieces of height data, started from a certain sample point as a start point, from the height data for one line, comparing each piece of the acquired height data with an average value of the acquired height data, and extracting a sample point having height data larger than the average value, the extraction processing being executed in an entire region of the height data for one line while the start point is shifted; a natural defect candidate portion determination unit that executes determination processing of determining continuous sample points, included in the extracted sample points, as a single natural defect candidate portion; and a differentiation unit that previously stores a condition characteristic of an intentional irregularity portion formed on the measurement surface, and executes differentiation processing of differentiating between the intentional irregularity portion and the natural defect portion by excluding the natural defect candidate portion satisfying the condition from the natural defect candidate portion.

With the invention, the natural defect portion on the tire surface can be accurately evaluated.

DESCRIPTION OF EMBODIMENTS

Figure 1:
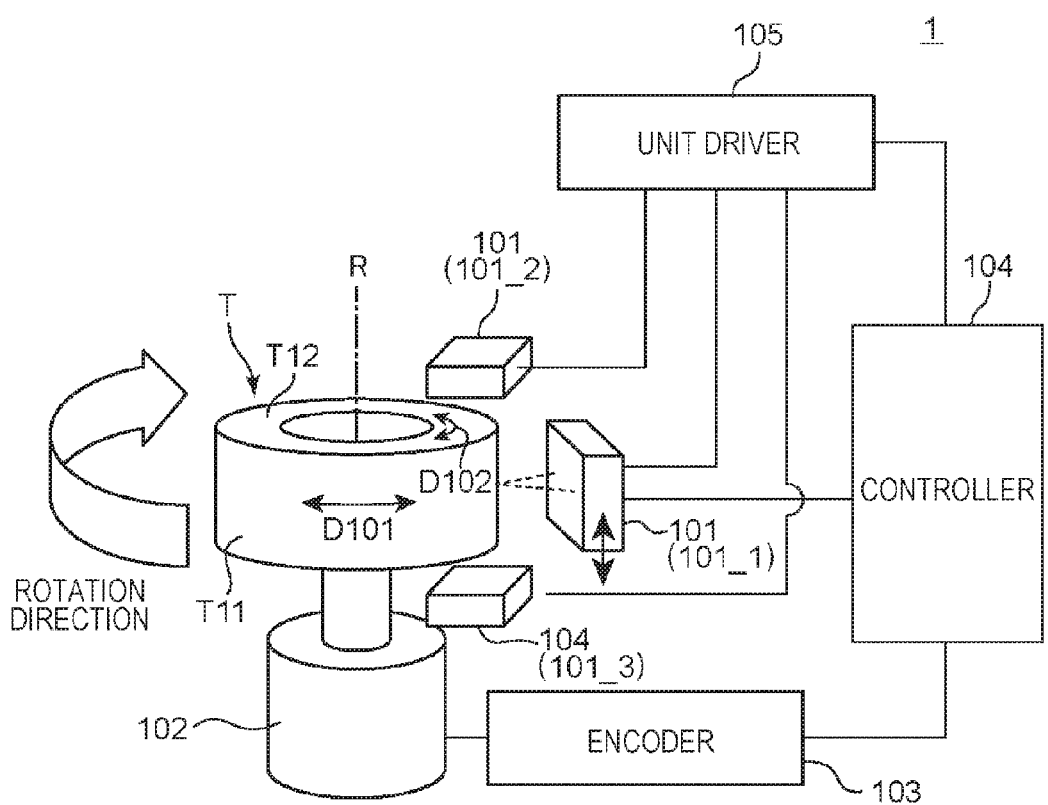
FIG. 1 is a general configuration diagram of a data processing apparatus according to an embodiment of the invention.

FIG. 1 is a general configuration diagram of a data processing apparatus 1 according to an embodiment of the invention. The data processing apparatus 1 is an apparatus that executes processing on data (shape data) indicative of the shape of a measurement surface for evaluating a natural defect portion formed on the measurement surface when a tread surface T11 or a sidewall surface T12 of a tire T is treated as the measurement surface.

The data processing apparatus 1 includes a shape sensor 101, a rotating portion 102, an encoder 103, a controller 104, and a unit driver 105. The rotating portion 102 rotates the tire T about a rotation axis R serving as the center axis. To be specific, the rotating portion 102 includes a shaft mounted at the center axis of the tire T, a motor for rotating the shaft, etc. The rotation speed of the tire T by the rotating portion 102 employs, for example, 60 rpm.

The shape sensor 101 includes a shape sensor 101_1 provided at the tread surface T11 side of the tire T, a shape sensor 101_2 provided at one (in FIG. 1, upper one) of sidewall surfaces T12 of the tire T, and a shape sensor 101_3 provided at the other one (in FIG. 1, lower one) of the sidewall surfaces T12 of the tire T. The shape sensor 101_1 is used when the tread surface T11 is measured. The shape sensor 101_2 is used when the one of the sidewall surfaces T12 is measured. The shape sensor 101_3 is used when the other one of the sidewall surfaces T12 is measured.

The shape sensor 101_1 irradiates the tread surface T11 of the rotating tire T with light, scans the tread surface T11 in a circumferential direction D101, receives reflection light from the tire T, and acquires measurement data for one line (in other words, one round) in the circumferential direction D101. In this case, the circumferential direction D101 indicates the direction of the outer periphery of the tire T when the tire T is cut in a plane orthogonal to the rotation axis R.

Similarly to the shape sensor 101_1, each of the shape sensors 101_2 and 101_3 irradiates the sidewall surface T12 of the rotating tire T with light, scans the sidewall surface T12 in a circumferential direction D102, and acquires measurement data for one line (one round) in the circumferential direction D102. In this case, the circumferential direction D102 is a direction of the outer periphery of a concentric circle when a concentric circle with a certain radius is plotted about the rotation axis R on the sidewall surface T12.

The encoder 103 outputs an angular signal indicative of a rotation angle to the controller 104 every time when the tire T rotates by a predetermined angle. The angular signal is used for determining the measurement timing of the shape sensor 101.

The controller 104 is configured of, for example, a microcontroller. The controller 104 executes processing (described later) on the measurement data output from the shape sensor 101. The unit driver 105 includes three arm portions (not illustrated) for positioning the shape sensors 101_1 to 101_3, three motors for respectively moving the three arm portions, etc. The unit driver 105 positions the shape sensors 101_1 to 101_3 under the control of the controller 104.

FIG. 1 illustrates the embodiment provided with the three shape sensors 101_1 to 101_3; however, it is not limited thereto. For example, one or two of the shape sensors 101_1 to 101_3 may be omitted.

Figure 2:
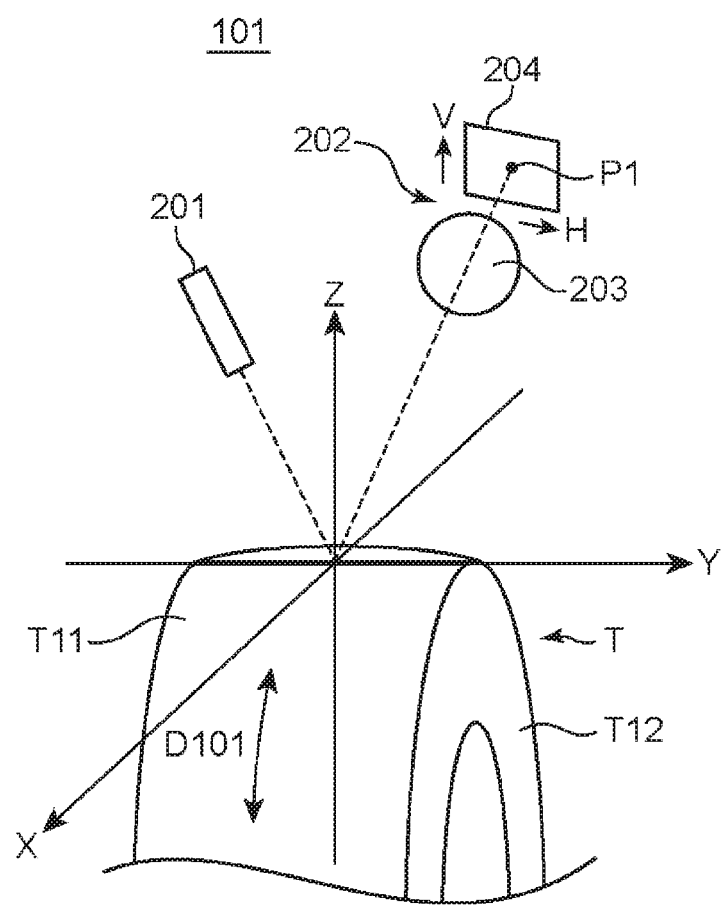
FIG. 2 is a specific configuration diagram of a shape sensor.

FIG. 2 is a specific configuration diagram of the shape sensor 101. FIG. 2 illustrates the shape sensor 101_1 in measurement on the tread surface T11. In FIG. 2, the Y-axis represents a direction parallel to the rotation axis R, the Z-axis represents a direction of the normal to the tread surface T11, and the X-axis represents a direction orthogonal to the X-axis and the Z-axis.

A light source 201 is a light source including a semiconductor laser, a cylindrical lens, etc. The light source 201 irradiates the tire T with laser light in a spot form. In this case, the light source 201 provides irradiation with light in a direction intersecting with the Z-axis. The tire T is rotated by the rotating portion 102, and hence the laser light can scan the tread surface T11 of the tire T along the circumferential direction D101.

A camera 202 includes a camera lens 203 and an image pickup element 204. The camera lens 203 guides reflection light from the tread surface T11 to the image pickup element 204. The image pickup element 204 is configured of, for example, an image sensor such as CCD or CMOS, and receives the reflection light through the camera lens 203. The image pickup element 204 captures an image of the tread surface T11 under the control of the controller 104. Since the reflection light is preferably regular reflection light, the camera lens 203 is configured to guide regular reflection light to the image pickup element 204.

Figure 3:
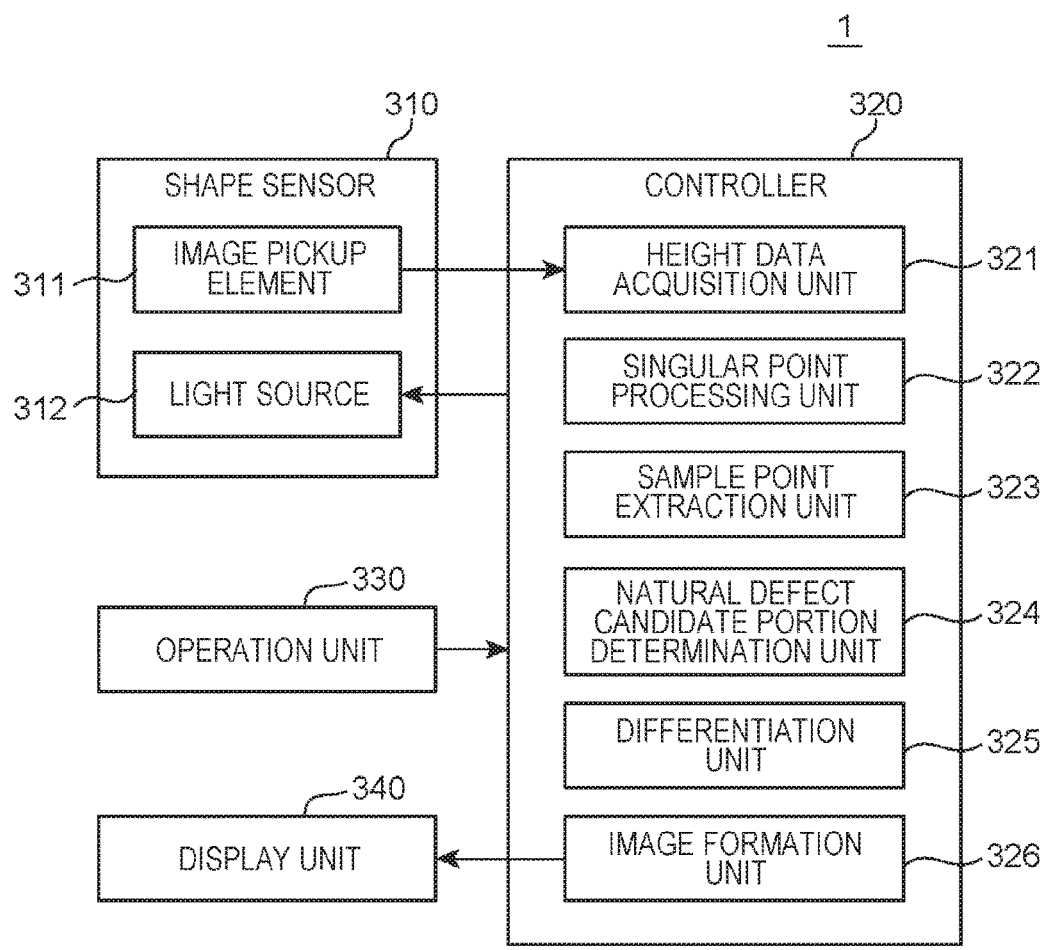
FIG. 3 is a block diagram showing an example of a configuration of the data processing apparatus according to the embodiment of the invention.

FIG. 3 is a block diagram showing an example of a configuration of the data processing apparatus 1 according to the embodiment of the invention. The data processing apparatus 1 includes a shape sensor 310, a controller 320, an operation unit 330, and a display unit 340.

The shape sensor 310 treats the tread surface T11 or the sidewall surface T12 of the tire T as a measurement surface, and measures the shape of the measurement surface in a non-contact manner. To be specific, the shape sensor 310 corresponds to the shape sensor 101 shown in FIG. 1, and includes an image pickup element 311 and a light source 312. The image pickup element 311 corresponds to the image pickup element 204 shown in FIG. 2. The light source 312 corresponds to the light source 201 shown in FIG. 2.

The controller 320 corresponds to the controller 104 shown in FIG. 1. The controller 320 includes a height data acquisition unit 321, a singular point processing unit 322, a sample point extraction unit 323, a natural defect candidate portion determination unit 324, a differentiation unit 325, and an image formation unit 326. The height data acquisition unit 321 scans the measurement surface with the shape sensor 310 every constant sampling period, acquires measurement data for one line, and calculates height data for one line by using the principle of triangulation from the acquired measurement data. In this embodiment, height data for one line along the circumferential direction D101 of the tread surface T11 or height data for one line along the circumferential direction D102 of the sidewall surface T12 shown in FIG. 1 is acquired.

In the example in FIG. 2, if it is assumed that a horizontal direction H of the image pickup element 204 is parallel to the Y-axis, the coordinate of a light receiving point P1 in a vertical direction V may be changed depending on the height of the tread surface T11. Hence, the height data acquisition unit 321 causes the image pickup element 204 to continuously capture images of the tread surface T11 of the rotating tire T irradiated with the laser light, at a constant frame rate. Then, the height data acquisition unit 321 plots the coordinate in the vertical direction V of the light receiving point P1 in time series in a two-dimensional coordinate space in which the vertical axis represents the coordinate in the vertical direction V of the light receiving point P1 and the horizontal axis represents the time axis. Then, the height data acquisition unit 321 uses each plot point as a sample point, obtains height data of each sample point from the coordinate along the vertical axis of the sample point by using the principle of triangulation, and acquires height data for one line along the circumferential direction D101 of the tread surface T11. In this case, the number of sample points in the height data for one line employs, for example, a number from about 1000 to about 5000. Hence, the height data for one line is a data group configured of height data for the number of sample points.

Figure 4:
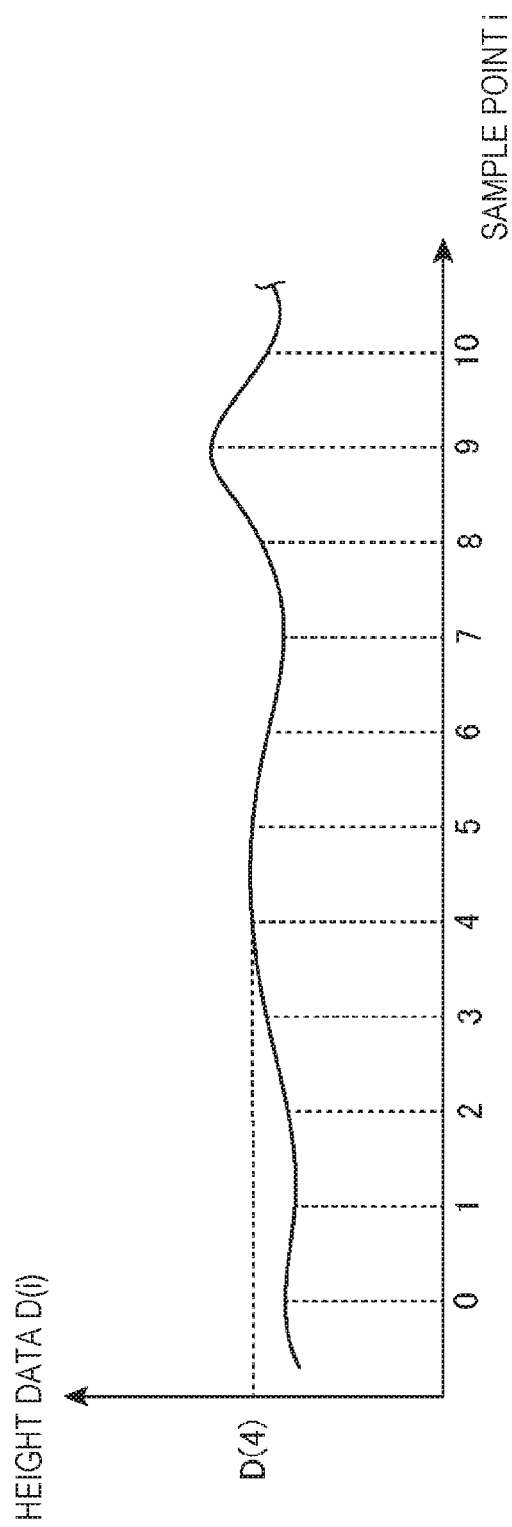
FIG. 4 is a graph showing a specific example of height data for one line.

FIG. 4 is a graph showing a specific example of height data D(i) for one line. The horizontal axis represents the position of a sample point on a measurement surface, and the vertical axis represents the height data at the sample point. FIG. 4 illustrates not all sample points constituting the height data D(i) for one line, but illustrates continuous eleven sample points 0 to 10. D(i) indicates height data of a sample point i. For example, D(4) indicates height data of a sample point 4.

The singular point processing unit 322 excludes a singular point from the height data D(i) for one line by using a median filter or an average-value filter. Singular points include a sample point at which height data indicates a burr or a spew of the tire T, a sample point at which height data indicates a contamination adhering to the measurement surface, and a sample point at which height data indicates a measurement failure by the shape sensor 310.

The burr represents a thin protrusion generated when a tire T is molded with a die. The spew represents a whisker-like protrusion generated when a tire T is molded with a die. The sample point indicative of the measurement failure represents a sample point at which correct height data cannot be obtained because laser light is blocked.

In many cases, the natural defect portion is a bulging portion having a shape approximate to a normal distribution shape. Hence, both the natural defect portion and the intentional irregularity portion like a character or a pattern protrude as compared with a flat portion (that is, a portion without the intentional irregularity portion) of the tire surface (the tread surface T11 or the sidewall surface T12).

Accordingly, processing of extracting the natural defect portion and the intentional irregularity portion as natural defect candidate portions, and differentiating between the natural defect portion and the intentional irregularity portion among the natural defect candidate portions is executed. This processing is executed by the sample point extraction unit 323, the natural defect candidate portion determination unit 324, and the differentiation unit 325.

The sample point extraction unit 323 executes extraction processing of acquiring a continuous constant number of pieces of height data, started from a certain sample point as a start point, from the height data D(i) for one line, comparing each piece of the acquired height data with the average value of the acquired height data, and extracting a sample point having height data larger than the average value, in the entire region of the height data D(i) for one line while the start point is shifted. That is, the sample point extraction unit 323 extracts a sample point possibly constituting a natural defect candidate portion.

The natural defect candidate portion determination unit 324 executes determination processing of determining continuous sample points, included in the sample points extracted by the sample point extraction unit 323, as a single natural defect candidate portion.

The differentiation unit 325 previously stores a condition characteristic of the shape of an intentional irregularity portion formed on the measurement surface of the tire surface, and executes differentiation processing of differentiating between an intentional irregularity portion and a natural defect portion by excluding a natural defect candidate portion satisfying the condition from natural defect candidate portions. The sample point extraction unit 323, the natural defect candidate portion determination unit 324, and the differentiation unit 325 are described later more specifically.

The image formation unit 326 uses the intentional irregularity portion and the natural defect portion differentiated by the differentiation unit 325, generates a graph or the like after the height data indicative of the intentional irregularity portion is excluded from the height data D(i) for one line, and causes the display unit 340 to display the graph.

The operation unit 330 receives an operation instruction for operating the data processing apparatus 1 from an operator and outputs the operation instruction to the controller 320.

The display unit 340 is configured of, for example, a liquid crystal display panel, and displays the graph or the like generated by the image formation unit 326.

Figure 5:
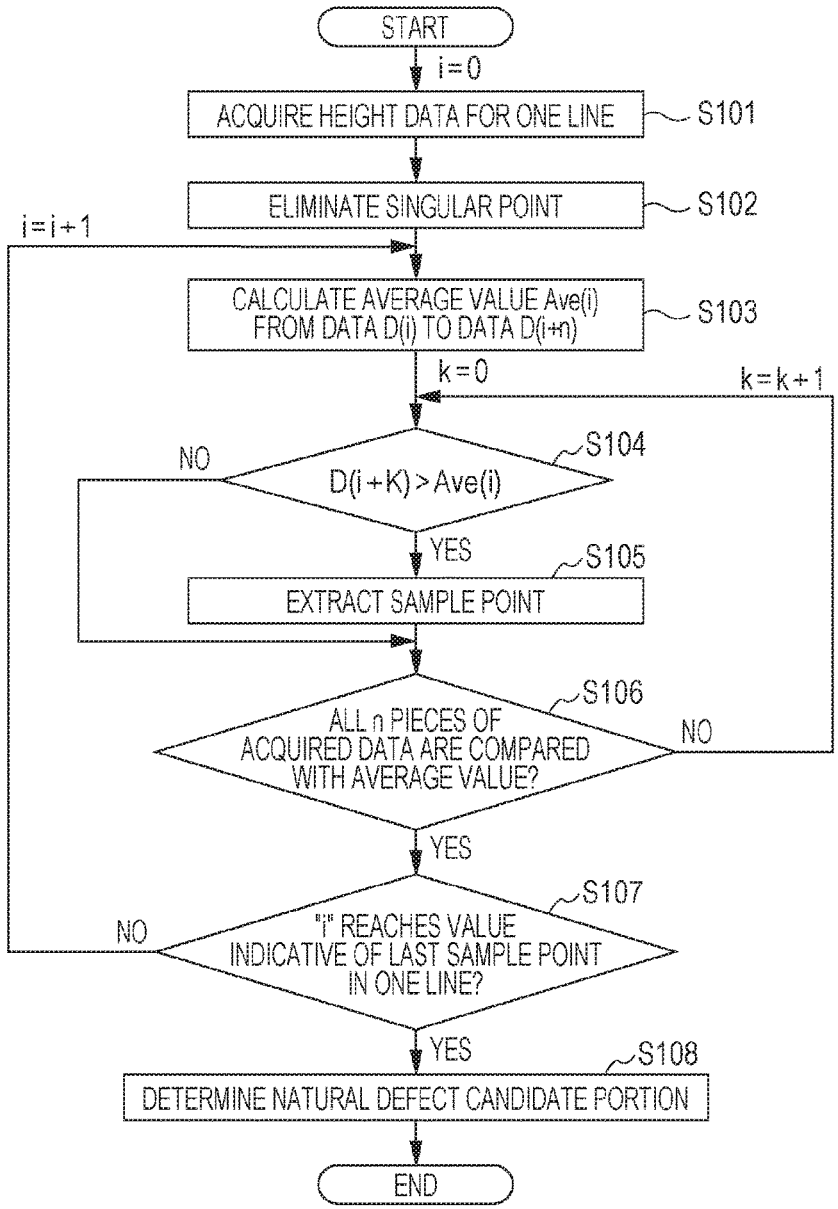
FIG. 5 is a flowchart showing an operation up to determination on a natural defect candidate portion included in an operation of the data processing apparatus according to the embodiment of the invention.

An operation of the data processing apparatus 1 according to the embodiment of the invention is described with reference to FIGS. 3 to 5. FIG. 5 is a flowchart showing an operation up to determination on a natural defect candidate portion included in this operation. First, the height data acquisition unit 321 causes the shape sensor 310 to scan once around the measurement surface of the tire surface, and acquires height data D(i) for one line (S101). The height data D(i) for one line has been described above with reference to FIG. 4.

Then, the singular point processing unit 322 eliminates a singular point from the height data D(i) for one line (S102). As described above, singular points include a sample point at which height data indicates a burr or a spew of a tire, a sample point at which height data indicates a contamination adhering to the measurement surface, and a sample point at which height data indicates a measurement failure by the shape sensor 310.

Then, the sample point extraction unit 323 acquires height data of a continuous number n of sample points, started from a certain sample point as a start point, from the height data D(i) for one line, and calculates the average value of the acquired height data (S103).

The sample point extraction unit 323 compares the average value calculated in step S103 with the height data acquired in step S103 (S104). If the sample point extraction unit 323 judges that the height data acquired in step S103 is larger than the average value (YES in S104), the sample point extraction unit 323 extracts the sample point of the height data (S105). This is because the sample point possibly configures a natural defect candidate portion.

In contrast, if the sample point extraction unit 323 judges that the height data acquired in step S103 is equal to or smaller than the average value (NO in S104), the sample point extraction unit 323 does not extract the sample point of the height data. Then, the sample point extraction unit 323 judges whether or not the comparison with the average value is completed for all height data acquired in step S103 (S106).

Describing more specifically, referring to FIG. 4, it is assumed that the continuous number n of sample points are ten continuous sample points 0 to 9. Height data at the sample points 0 to 9 are compared with the average value of the height data at the sample points 0 to 9 sequentially from the sample point 0. Every time when the comparison between the height data of each sample point and the average value is completed, it is judged whether or not the comparison with the average value is completed for all the acquired height data. If the comparison between the height data at the sample point 9 and the average value is completed, it is judged that the comparison with the average value is completed for all the acquired height data.

If the sample point extraction unit 323 judges that the comparison with the average value is not completed (NO in S106), the sample point extraction unit 323 executes the processing in step S104 on height data at the next sample point. For example, if the comparison between the height data D(0) at the sample point 0 with the average value is completed, the processing in step S104 is executed on the height data D(1) at the sample point 1.

If the sample point extraction unit 323 judges that the comparison with the average value is completed (YES in S106), the sample point extraction unit 323 judges whether or not "i" of the height data D(i) reaches the value indicative of the last sample point in one line (S107).

If the sample point extraction unit 323 judges that "i" of the height data D(i) does not reach the value indicative of the last sample point in one line (NO in S107), the operation returns to the processing in step S103. Describing more specifically, with reference to FIG. 4, if the processing up to step S106 is completed for the ten sample points 0 to 9, the start point of the sample points is shifted by one, and the processing from step S103 is started for ten sample points 1 to 10.

If the sample point extraction unit 323 judges that "i" of the height data D(i) reaches the value indicative of the last sample point in one line (YES in S107), the natural defect candidate portion determination unit 324 executes processing of determining a natural defect candidate portion (S108). Describing more specifically, the natural defect candidate portion determination unit 324 executes processing of treating continuous sample points as a single natural defect candidate portion among the sample points extracted in step S105, and determining a natural defect candidate portion from the sample points extracted in step S105. Referring to FIG. 4, for example, if sample points 4, 5, 6, 8, and 9 are extracted, the sample points 4, 5, and 6 are determined as a single natural defect candidate portion, and the sample points 8 and 9 are determined as a single natural defect candidate portion.

The above-described operation is the operation up to the determination on the natural defect candidate portion.

Figure 6:
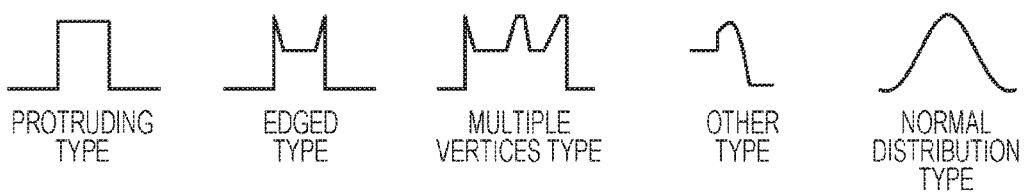
FIG. 6 provides explanatory illustrations explaining the shapes of intentional irregularity portions and the shape of a natural defect portion.

Described next is an operation after the determination on the natural defect candidate portion included in the operation of the data processing apparatus 1 according to the embodiment of the invention. After the natural defect candidate portion is determined, the differentiation unit 325 executes processing of differentiating between the natural defect portion and the intentional irregularity portion. FIG. 6 provides explanatory illustrations explaining the shapes of intentional irregularity portions and the shape of a natural defect portion. The shapes of the intentional irregularity portions can be classified into four types of a protruding type, an edged type, a multiple vertices type, and other type other than these types. In contrast, the shape of a natural defect portion can be approximated to a shape of a normal distribution type. The protruding type is a shape having a flat center portion, the center portion being higher than both end portions. The edged type is a shape having a single vertex at one end portion side and a single vertex at the other end portion side, these vertex portions being higher than a center portion. The multiple vertices type is a shape having a plurality of (three or more) vertices.

Figure 7:
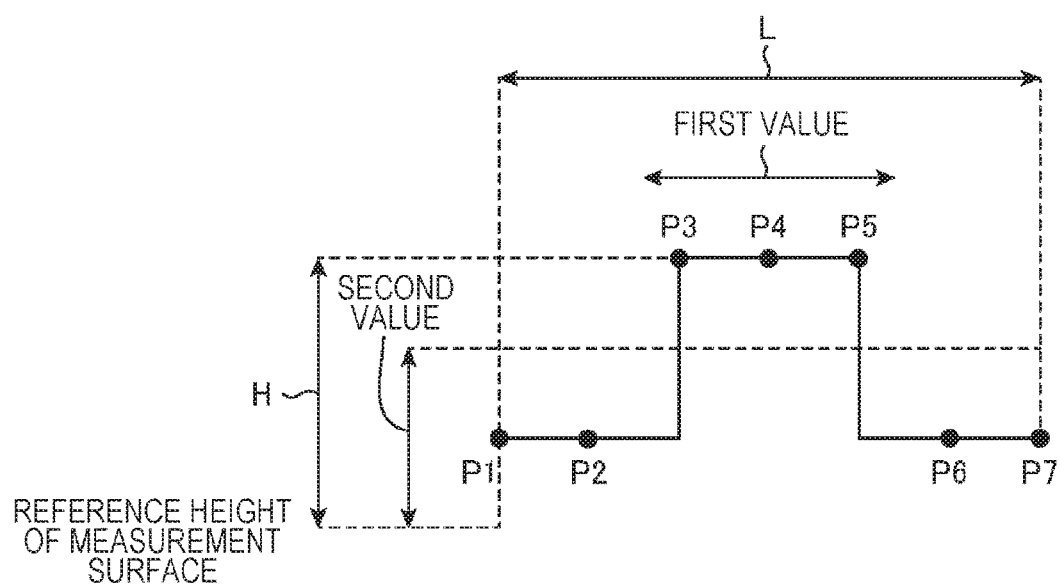
FIG. 7 is an enlarged view showing the shape indicative of a protruding type in FIG. 6 in an enlarged manner.

The length and height of a natural defect candidate portion are described with reference to a natural defect candidate portion of the protruding type as an example. FIG. 7 is an enlarged view showing a shape indicative of the protruding type in FIG. 6 in an enlarged manner. Among continuous sample points P1 to P7 constituting a natural defect candidate portion, it is assumed that the distance from the first sample point P1 to the last sample point P7 is a length L of the natural defect candidate portion.

Among the continuous sample points P1 to P7 constituting the natural defect candidate portion, it is assumed that the heights of the sample point P3, P4, and P5 having the maximum height are a height H of the natural defect candidate portion.

Natural defect candidate portions are classified into an intentional irregularity portion, a natural defect portion, and a harmless portion. The harmless portion is a portion that is generated on the tire surface, has a small height and a small length, and hence is not classified into an intentional irregularity portion or a natural defect portion. The harmless portion is harmless to the tire T. If the length L of a natural defect candidate portion is a first value or smaller, the natural defect candidate portion can be treated as a harmless portion. If the height H of a natural defect candidate portion is a second value or smaller, the natural defect candidate portion can be treated as a harmless portion.

Figure 8:
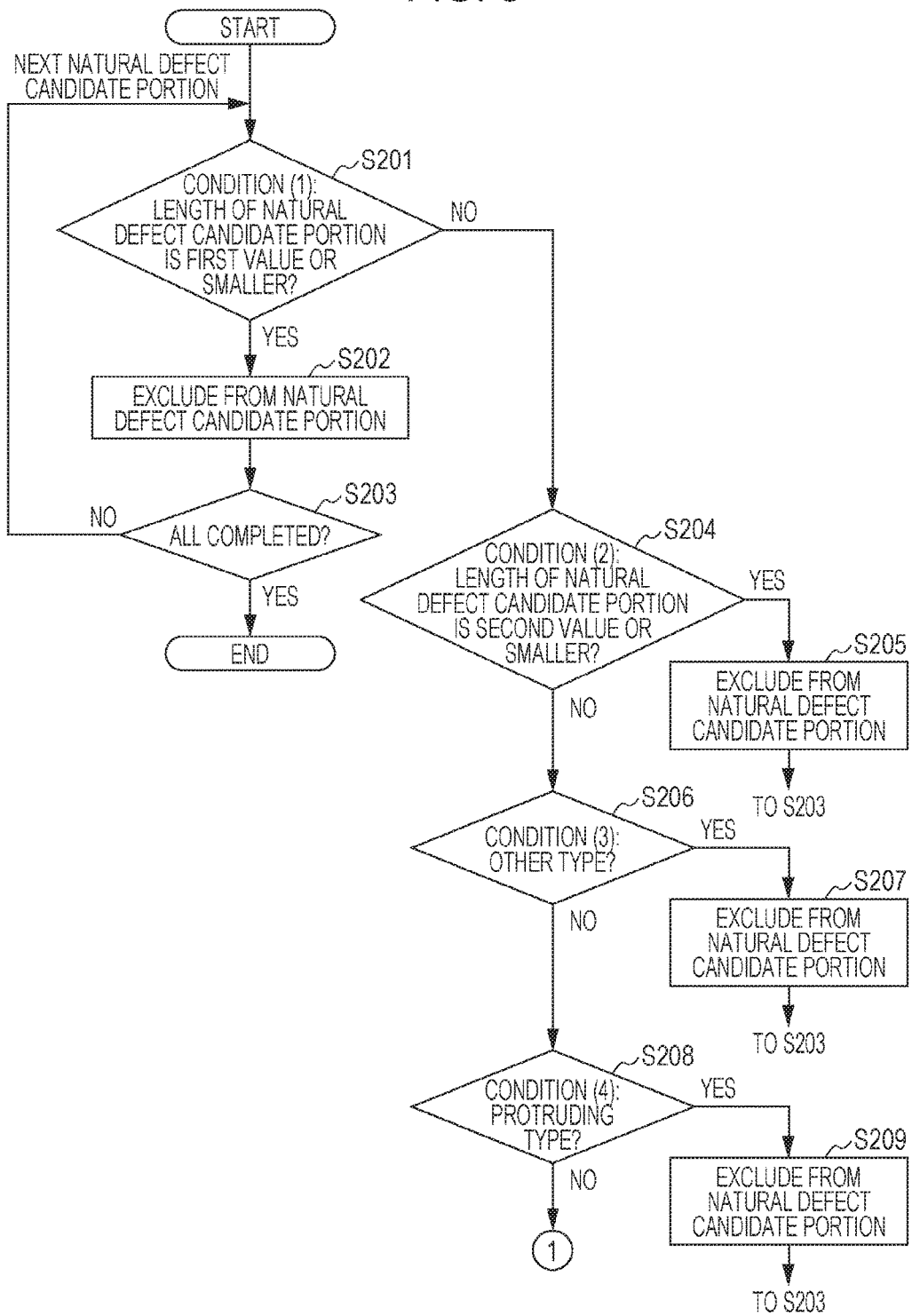
FIG. 8 is a flowchart showing a first half section of an operation after the determination on the natural defect candidate portion included in the operation of the data processing apparatus according to the embodiment of the invention.
Figure 9:
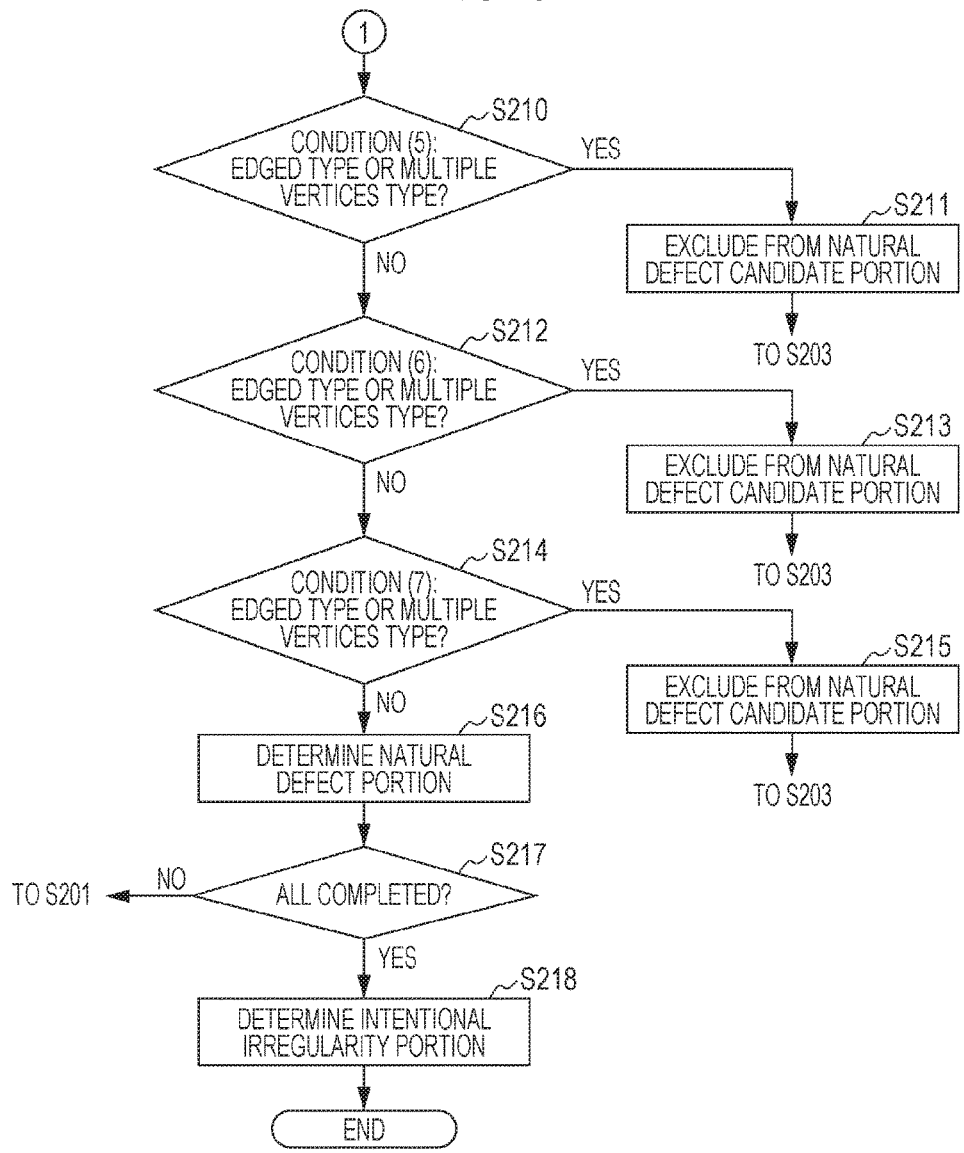
FIG. 9 is a flowchart showing a latter half section of the operation.
Figure 10:
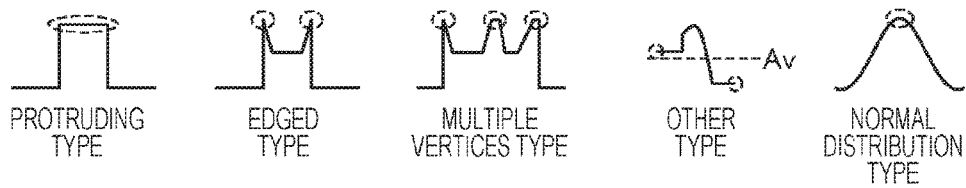
FIG. 10 provides illustrations in which portions to be focused are surrounded by dotted-line circles in differentiation processing on the shapes of the intentional irregularity portions and the shape of the natural defect portion shown in FIG. 6.

The differentiation unit 325 executes processing of differentiating between a natural defect portion and an intentional irregularity portion for each natural defect candidate portion. The differentiation processing is described below in detail with reference to FIGS. 7, 8, 9, and 10. FIGS. 8 and 9 provide a flowchart showing the operation after the determination on the natural defect candidate portion (that is, the operation of the differentiation processing) included in the operation of the data processing apparatus 1 according to the embodiment of the invention. FIG. 10 provides illustrations in which portions to be focused are surrounded by dotted-line circles on the shapes of the intentional irregularity portions and the shape of the natural defect portion shown in FIG. 6 in the differentiation processing.

A first value, a second value, a third value, a fourth value, a first ratio, a second ratio, and a third ratio in the following description are set at optimal values depending on the type or the like of tire T.

The differentiation unit 325 makes judgment on a condition (1) (S201). That is, the differentiation unit 325 judges whether or not the length L (FIG. 7) of the natural defect candidate portion is a predetermined first value or smaller. If the differentiation unit 325 judges that the condition (1) is satisfied (YES in S201), the differentiation unit 325 regards the natural defect candidate portion as a harmless portion, and excludes the judged portion from natural defect candidate portions (S202).

The differentiation unit 325 judges whether or not the differentiation processing is completed for all natural defect candidate portions (S203). If the differentiation unit 325 judges that the processing is completed (YES in S203), the differentiation processing is ended. If the differentiation unit 325 judges that the processing is not completed (NO in S203), the differentiation unit 325 executes the processing in step S201 on the next natural defect candidate portion.

If the differentiation unit 325 judges that the condition (1) is not satisfied (NO in S201), the differentiation unit 325 makes judgment on a condition (2) (S204). That is, the differentiation unit 325 judges whether or not the height H (FIG. 7) of the natural defect candidate portion is a predetermined second value or smaller. If the differentiation unit 325 judges that the condition (2) is satisfied (YES in S204), the differentiation unit 325 regards the natural defect candidate portion as a harmless portion, and excludes the portion from the natural defect candidate portions (S205). Then, the operation returns to step S203.

If the differentiation unit 325 judges that the condition (2) is not satisfied (NO in S204), the differentiation unit 325 makes judgment on a condition (3) (S206). In this step, the differentiation unit 325 judges whether or not the natural defect candidate portion is an intentional irregularity portion having a shape of the other type shown in FIG. 10. That is, the differentiation unit 325 judges whether or not the height of one of the first sample point and the last sample point among the continuous sample points constituting the natural defect candidate portion is larger than an average value Av (FIG. 10) of the heights of the continuous sample points constituting the natural defect candidate portion, and the height of the other one of the first sample point and the last sample point is smaller than the average value Av.

If the differentiation unit 325 judges that the condition (3) is satisfied (YES in S206), the differentiation unit 325 regards the natural defect candidate portion as an intentional irregularity portion having a shape of the other type, and excludes the portion from the natural defect candidate portions (S207). Then, the operation returns to step S203.

If the differentiation unit 325 judges that the condition (3) is not satisfied (NO in S206), the differentiation unit 325 makes judgment on a condition (4) (S208). In this step, the differentiation unit 325 judges whether or not the natural defect candidate portion is an intentional irregularity portion having a shape of the protruding type shown in FIG. 10. That is, the differentiation unit 325 regards the natural defect candidate portion as an intentional irregularity portion having a shape of the protruding type if the sum of a sample point having the maximum height and a sample point having a height of a predetermined first ratio or higher to the height of the sample point is a predetermined second ratio or higher to the continuous sample points constituting the natural defect candidate portion. Then the differentiation unit 325 excludes the portion from the natural defect candidate portion. The sample point having the height of the predetermined first ratio or higher to the height of the sample point is, in other words, a sample point having a height approximate to the maximum height. This is focused on that, as indicated by a dotted-line circle in FIG. 10, a shape of the protruding type has a relatively high ratio of presence of a sample point having the maximum height and a sample point having a height approximate to the maximum height.

If the differentiation unit 325 judges that the condition (4) is satisfied (YES in S208), the differentiation unit 325 regards the natural defect candidate portion as an intentional irregularity portion having a shape of the protruding type, and excludes the portion from the natural defect candidate portions (S209). Then, the operation returns to step S203.

If the differentiation unit 325 judges that the condition (4) is not satisfied (NO in S208), the differentiation unit 325 makes judgment on a condition (5) (S210). As long as any one of the conditions (5) to (7) is satisfied, the natural defect candidate portion is regarded as an intentional irregularity portion having a shape of the edged type or the multiple vertices type shown in FIG. 10. This is focused on that, as indicated by dotted-line circles in FIG. 10, a shape of the normal distribution type has a single vertex at the center and a shape of the edged type or the multiple vertices type has a plurality of vertices being relatively separated from each other.

In step S210, when a sample point having the maximum height serves as a first sample point and previous and next sample points of the first sample point serve as a second sample point and a third sample point among the continuous sample points constituting the natural defect candidate portion, the differentiation unit 325 judges whether or not the difference between the height of the first sample point and the height of the second sample point and the difference between the height of the first sample point and the height of the third sample point are a predetermined third value or larger. This is focused on that an intentional irregularity portion having a shape of the edged type or the multiple vertices type has a relatively large differences between the height of the sample point with the maximum height and the heights of previous and next sample points of the sample point.

If the differentiation unit 325 judges that the condition (5) is satisfied (YES in S210), the differentiation unit 325 regards the natural defect candidate portion as an intentional irregularity portion having a shape of the edged type or the multiple vertices type, and excludes the portion from the natural defect candidate portions (S211). Then, the operation returns to step S203.

If the differentiation unit 325 judges that the condition (5) is not satisfied (NO in S210), the differentiation unit 325 makes judgment on a condition (6) (S212). That is, if there are a plurality of groups of continuous sample points having heights whose differences from the sample point having the maximum height are the third value or smaller among the continuous sample points constituting the natural defect candidate portion, the differentiation unit 325 judges whether or not the distance between the farthermost groups is a predetermined third ratio or higher to the length L of the natural defect candidate portion. This is focused on that, as indicated by dotted-line circles in FIG. 10, in an intentional irregularity portion having a shape of the edged type or the multiple vertices type, there are a plurality of protruding portions (that is, the aforementioned groups) and the distance between the farthermost groups is relatively large.

If the differentiation unit 325 judges that the condition (6) is satisfied (YES in S212), the differentiation unit 325 regards the natural defect candidate portion as an intentional irregularity portion having a shape of the edged type or the multiple vertices type, and excludes the portion from the natural defect candidate portions (S213). Then, the operation returns to step S203.

If the differentiation unit 325 judges that the condition (6) is not satisfied (NO in S212), the differentiation unit 325 makes judgment on a condition (7) (S214). That is, if there are the plurality of groups, the differentiation unit 325 judges whether or not the sum of variance of each of the plurality of groups is a predetermined fourth value or larger. In an intentional irregularity portion having a shape of the edged type or the multiple vertices type, as indicated by dotted-line circles in FIG. 10, there are a plurality of protruding portions (that is, the aforementioned groups). Hence, the sum of variance values of these groups may be larger than that of the sample point having the largest height. In contrast, a shape of the normal distribution type has a single protruding portion (the aforementioned group). Hence, the variance value of the group is relatively smaller than the sample point having the maximum height. The condition (7) is focused on this.

For the variance, for example, sample variance is employed. As the number of the continuous sample points increases, the variance increases. Hence, it is desirable to normalize and evaluate the sample variance to restrict the influence of the number of continuous samples. A method of normalization may be setting the variance of a group having the smallest number of continuous sample points at 1, and obtaining the variance of other groups.

If the differentiation unit 325 judges that the condition (7) is satisfied (YES in S214), the differentiation unit 325 regards the natural defect candidate portion as an intentional irregularity portion having a shape of the edged type or the multiple vertices type, and excludes the portion from the natural defect candidate portions (S215). Then, the operation returns to step S203.

If the differentiation unit 325 determines that the condition (7) is not satisfied (NO in S214), the differentiation unit 325 determines the natural defect candidate portion as a natural defect portion (S216).

The differentiation unit 325 judges whether or not the differentiation processing is completed for all natural defect candidate portions (S217). If the differentiation unit 325 judges that the processing is not completed (NO in S217), the operation returns to step S201. If the differentiation unit 325 judges that the processing is completed (YES in S217), the differentiation processing is ended.

After the differentiation unit 325 ends the differentiation processing, the differentiation unit 325 determines the natural defect candidate portion excluded as not satisfying one of the conditions (3) to (7), as an intentional irregularity portion (S218).

After the processing in the flows in FIGS. 5, 8, and 9, by operating the operation unit 330 in FIG. 3 and inputting a command to display an image and a graph, the image formation unit 326 generates the image and the graph and causes the display unit 340 to display the generated image and graph.

Figure 11:
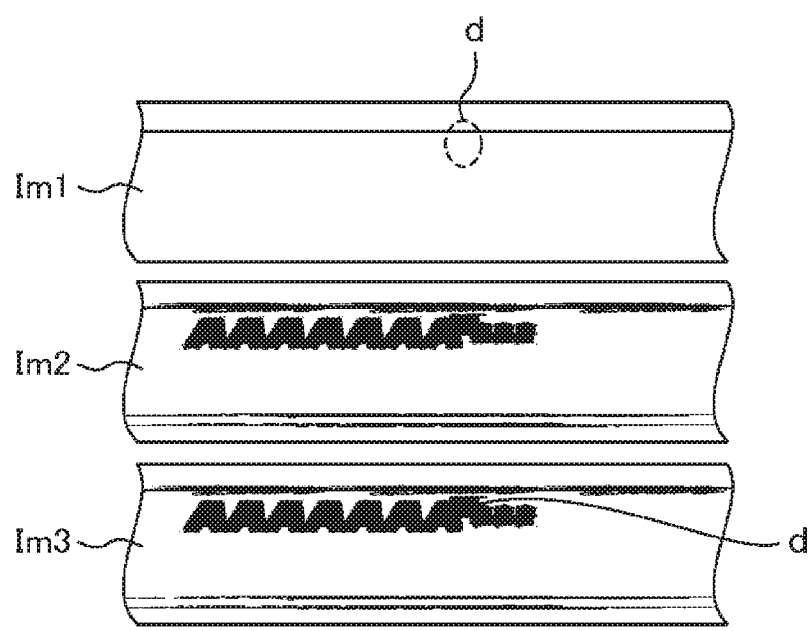
FIG. 11 provides illustrations showing examples of images displayed on a display unit included in the data processing apparatus according to the embodiment of the invention.

FIG. 11 provides illustrations showing examples of images displayed on the display unit 340. Images Im1, Im2, and Im3 are images of a portion of the tire surface captured by the image pickup element 311 of the shape sensor 310. The image Im1 is an image indicated by original data. The original data represents data obtained without the processing of extracting the natural defect candidate portion or the processing of differentiating between the natural defect portion and the intentional irregularity portion on image data output from the image pickup element 311. Reference sign d indicates a natural defect portion with a height of 1.1 mm.

The image Im2 is an image indicated by data obtained by executing the processing of extracting the natural defect candidate portion on the original data. The image Im2 can be generated by executing the processing shown in the flow in FIG. 5. Natural defect candidate portions include a natural defect portion and an intentional irregularity portion (character portion); however, these are not differentiated.

The image Im3 is an image indicated by data obtained by executing the processing of extracting the natural defect candidate portion on the original data and further executing the processing of differentiating between the natural defect portion and the intentional irregularity portion. The image Im3 can be generated by executing the processing shown in the flows in FIGS. 5, 8, and 9. The natural defect portion d and the intentional irregularity portion (character portion) are displayed in a differentiated manner.

Figure 12:
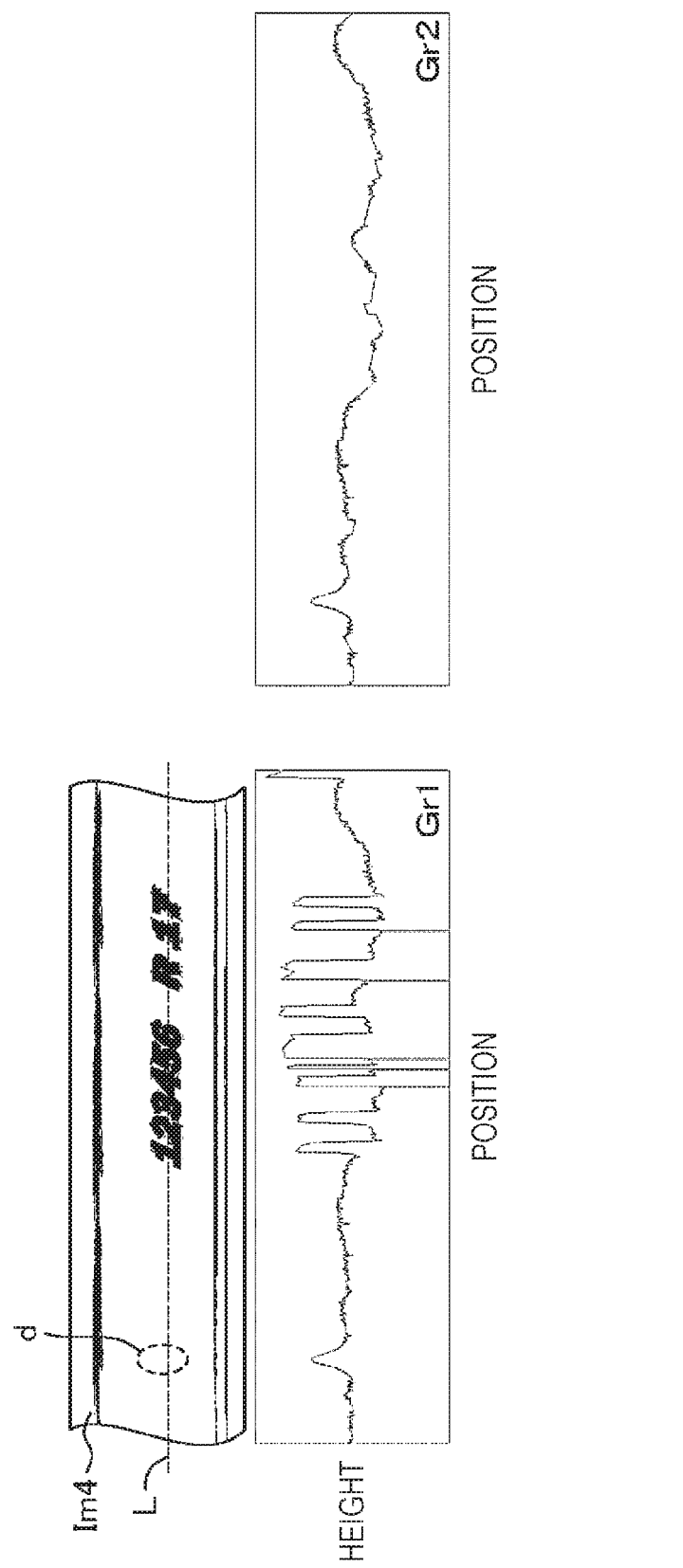
FIG. 12 is an illustration showing an example of an image and graphs displayed on the display unit included in the data processing apparatus according to the embodiment of the invention.

FIG. 12 is an illustration showing an example of an image and graphs displayed on the display unit 340. An image Im4 is an image indicated by data obtained by executing the processing of extracting the natural defect candidate portion on the original data and further executing the processing of differentiating between the natural defect portion and the intentional irregularity portion, similarly to the image Im3. Graphs Gr1 and Gr2 are graphs indicative of heights at a position indicated by a line L on the tire surface indicated in the image Im4. The vertical axis represents the height of the tire surface and the horizontal axis represents the position on the tire surface.

The graph Gr1 is a graph before height data indicative of intentional irregularity portions is excluded from the height data for one line. In contrast, the graph Gr2 is a graph after height data indicative of intentional irregularity portions is excluded from the height data for one line. In the graph Gr2, linear interpolations are applied to the position at which the height data indicative of the intentional irregularity portions is excluded. It is found that an intentional irregularity portion and a natural defect portion d are indicated in the graph Gr1, and the natural defect portion d is indicated while the intentional irregularity portion is not indicated in the graph Gr2.

Major advantageous effects according the embodiment of the invention are described. In the embodiment of the invention, as described with reference to FIG. 5, the natural defect candidate portion is determined from the height data for one line obtained by scanning the measurement surface with the shape sensor 310 every constant sampling period. Then, as described with reference to FIGS. 8 and 9, the differentiation processing of differentiating between the intentional irregularity portion and the natural defect portion is executed on each natural defect candidate portion. Accordingly, with the embodiment of the invention, since data indicative of the intentional irregularity portion can be excluded from the height data for one line, the natural defect portion formed on the tire surface can be accurately evaluated.

In many cases, the natural defect portion is a bulging portion having a shape approximate to a normal distribution shape. Hence, both the intentional irregularity portion and the natural defect portion protrude as compared with a flat portion (that is, a portion without the intentional irregularity portion) of the tire surface. If the differentiation processing of differentiating between the intentional irregularity portion and the natural defect portion is executed on all height data for one line, since the tire surface includes a flat portion as a matter of course, it is not necessary to execute the differentiation processing on the flat portion. The embodiment of the invention is focused on this point. Not all height data for measured one line is the target of the differentiation processing, but continuous sample points having certain heights are treated as a natural defect candidate portion, and the differentiation processing is executed on the natural defect candidate portion. As described above, since the target of the differentiation processing is narrowed down to the natural defect candidate portion, the differentiation processing can be efficiently executed.

In the embodiment of the invention, as described with reference to FIGS. 8 and 9, natural defect candidate portions can be classified into an intentional irregularity portion, a natural defect portion, and a harmless portion. The condition (1) and the condition (2) are conditions for differentiating between the natural defect portion and the harmless portion. The condition (3) is a condition for differentiating between the natural defect portion and the intentional irregularity portion having a shape of the other type (FIG. 6). The condition (4) is a condition for differentiating between the natural defect portion and the intentional irregularity portion having a shape of the protruding type (FIG. 6). Any of the conditions (5) to (7) is a condition for differentiating between the natural defect portion and the intentional irregularity portion having a shape of the edged type or the multiple vertices type. As long as the predetermined values (the third values) are equivalent and all the conditions (5) to (7) are executed, the effect of differentiating between the natural defect portion and the intentional irregularity portion having a shape of the edged type or the multiple vertices type can be enhanced. With the embodiment of the invention, since all the conditions (3) to (7) are executed, the effect of classifying natural defect candidate portions into the intentional irregularity portion, the natural defect portion, and the harmless portion can be enhanced.

With the embodiment of the invention, the conditions (1) to (7) are executed; however, one condition or a plurality of conditions may be selected from the conditions (1) to (7) and may be executed in accordance with the type or the like of the tire T.

SUMMARY OF EMBODIMENT

A data processing apparatus according to a first aspect of the invention treats a tread surface or a sidewall surface of a tire as a measurement surface, and processes data indicative of a shape of the measurement surface to evaluate a natural defect portion formed on the measurement surface. The data processing apparatus includes a sample point extraction unit that executes extraction processing on height data for one line obtained by scanning the measurement surface with a shape sensor every constant sampling period, the extraction processing acquiring a continuous constant number of pieces of height data, started from a certain sample point as a start point, from the height data for one line, comparing each piece of the acquired height data with an average value of the acquired height data, and extracting a sample point having height data larger than the average value, the extraction processing being executed in an entire region of the height data for one line while the start point is shifted; a natural defect candidate portion determination unit that executes determination processing of determining continuous sample points, included in the extracted sample points, as a single natural defect candidate portion; and a differentiation unit that previously stores a condition characteristic of an intentional irregularity portion formed on the measurement surface, and executes differentiation processing of differentiating between the intentional irregularity portion and the natural defect portion by excluding the natural defect candidate portion satisfying the condition from the natural defect candidate portion.

With the data processing apparatus according to the first aspect of the invention, the natural defect candidate portion is determined from the height data for one line obtained by scanning the measurement surface with the shape sensor every constant sampling period. Then, the differentiation processing of differentiating between the intentional irregularity portion and the natural defect portion is executed on each natural defect candidate portion. Accordingly, with the data processing apparatus according to the first aspect of the invention, since data indicative of the intentional irregularity portion can be excluded from the height data for one line, the natural defect portion formed on the tire surface can be accurately evaluated.

In many cases, the natural defect portion is a bulging portion having a shape approximate to a normal distribution shape. Hence, both the intentional irregularity portion and the natural defect portion protrude as compared with a flat portion (that is, a portion without the intentional irregularity portion) of the tire surface. If the differentiation processing of differentiating between the intentional irregularity portion and the natural defect portion is executed on all height data for one line, since the tire surface includes a flat portion as a matter of course, it is not necessary to execute the differentiation processing on the flat portion. The data processing apparatus according to the first aspect of the invention is focused on this point. Not all measured height data for one line is the target of the differentiation processing, but continuous sample points having certain heights are treated as a natural defect candidate portion, and the differentiation processing is executed on the natural defect candidate portion. As described above, since the target of the differentiation processing is narrowed down to the natural defect candidate portion, the differentiation processing can be efficiently executed.

In the above configuration, the condition characteristic of the shape of the intentional irregularity portion is at least one of conditions (1) to (7).

(1) Among the continuous sample points constituting the natural defect candidate portion, when a distance from a first sample point to a last sample point is a length of the natural defect candidate portion, if the length is a predetermined first value or smaller, the natural defect candidate portion is regarded as a harmless portion being harmless to the tire and is excluded from the natural defect candidate portion.

(2) Among the continuous sample points constituting the natural defect candidate portion, when a sample point having a maximum height is a height of the natural defect candidate portion, if the height is a predetermined second value or smaller, the natural defect candidate portion is regarded as the harmless portion and is excluded from the natural defect candidate portion.

(3) Among the continuous sample points constituting the natural defect candidate portion, if a height of one of the first sample point and the last sample point is larger than an average value of heights of the continuous sample points constituting the natural defect candidate portion, and if a height of the other one of the first sample point and the last sample point is smaller than the average value, the natural defect candidate portion is regarded as the intentional irregularity portion having a shape of a type other than a protruding type, an edged type, and a multiple vertices type and is excluded from the natural defect candidate portion.

(4) Among the continuous sample points constituting the natural defect candidate portion, if a sum of the sample point having the maximum height and a sample point having a height of a predetermined first ratio or higher to the height of the sample point is a predetermined second ratio or higher to the continuous sample points constituting the natural defect candidate portion, the natural defect candidate portion is regarded as the intentional irregularity portion having a shape of the protruding type and is excluded from the natural defect candidate portion.

(5) Among the continuous sample points constituting the natural defect candidate portion, when the sample point having the maximum height is a first sample point and previous and next sample points of the first sample point are a second sample point and a third sample point, if a difference between the height of the first sample point and a height of the second sample point and a difference between the height of the first sample point and a height of the third sample point are a predetermined third value or larger, the natural defect candidate portion is regarded as the intentional irregularity portion having a shape of the edged type or the multiple vertices type and is excluded from the natural defect candidate portion.

(6) Among the continuous sample points constituting the natural defect candidate portion, if a group of continuous sample points having heights whose differences from the sample point having the maximum height are the third value or smaller includes a plurality of groups, and if a distance between the farthermost groups is a predetermined third ratio or higher to the length of the natural defect portion, the natural defect candidate portion is regarded as the intentional irregularity portion having a shape of the edged type or the multiple vertices type and is excluded from the natural defect candidate portion.

(7) If the group includes the plurality of groups, and if a sum of variance of each of the plurality of groups is a predetermined fourth value or larger, the natural defect candidate portion is regarded as the intentional irregularity portion having a shape of the edged type or the multiple vertices type and is excluded from the natural defect candidate portion.

The condition (1) and the condition (2) are conditions for differentiating between the natural defect portion and the harmless portion. The harmless portion is a portion that is generated on the tire surface, has a small height and a small length, and hence is not classified into the intentional irregularity portion or the natural defect portion. The harmless portion is harmless to the tire. The condition (3) is a condition for differentiating between the natural defect portion and the intentional irregularity portion having a shape of the other type (FIG. 6). The condition (4) is a condition for differentiating between the natural defect portion and the intentional irregularity portion having a shape of the protruding type (FIG. 6). Any of the conditions (5) to (7) is a condition for differentiating between the natural defect portion and the intentional irregularity portion having a shape of the edged type or the multiple vertices type. As long as the predetermined values (the third values) are equivalent and all the conditions (5) to (7) are executed, the effect of differentiating between the natural defect portion and the intentional irregularity portion having a shape of the edged type or the multiple vertices type can be enhanced. By executing all the conditions (3) to (7), the effect of differentiating between the natural defect portion and the intentional irregularity portion can be enhanced.

In the above-described configuration, the condition characteristic of the shape of the intentional irregularity portion is the condition (4).

The condition (4) is a condition for differentiating between the natural defect portion and the intentional irregularity portion having a shape of the protruding type. In many cases, the intentional irregularity portion has a shape of the protruding type, and hence it is desirable that the differentiation unit can make judgment on the condition (4).

A data processing method according to a second aspect of the invention treats a tread surface or a sidewall surface of a tire as a measurement surface, and processes data indicative of a shape of the measurement surface to evaluate a natural defect portion formed on the measurement surface. The data processing method includes a sample point extraction step of executing extraction processing on height data for one line obtained by scanning the measurement surface with a shape sensor every constant sampling period, the extraction processing acquiring a continuous constant number of pieces of height data, started from a certain sample point as a start point, from the height data for one line, comparing each piece of the acquired height data with an average value of the acquired height data, and extracting a sample point having height data larger than the average value, the extraction processing being executed in an entire region of the height data for one line while the start point is shifted; a natural defect candidate portion determination step of executing determination processing of determining continuous sample points, included in the extracted sample points, as a single natural defect candidate portion; and a differentiation step of previously preparing a condition characteristic of an intentional irregularity portion formed on the measurement surface, and executing differentiation processing of differentiating between the intentional irregularity portion and the natural defect portion by excluding the natural defect candidate portion satisfying the condition from the natural defect candidate portion.

The data processing method according to the second aspect of the invention defines the invention as a method, and has advantageous effects similar to the data processing apparatus according the first aspect of the invention.

The invention claimed is:

1. A data processing apparatus that treats a tread surface or a sidewall surface of a tire as a measurement surface, and processes data indicative of a shape of the measurement surface to evaluate a natural defect portion formed on the measurement surface, the apparatus comprising:
   a shape sensor for measuring the shape of the measurement surface of the tire;
   a height data acquisition unit that scans the measuring surface of the tire with the shape sensor every constant sampling time period to acquire one line of measurement data, which corresponds to one round of the tire in the circumferential direction, and calculates height data for one line;
   a sample point extraction unit that executes extraction processing on height data for one line obtained by scanning the measurement surface with a shape sensor every constant sampling period, the extraction processing acquiring a continuous constant number of pieces of height data, started from a certain sample point as a start point, from the height data for one line, comparing each piece of the acquired height data with an average value of the acquired height data, and extracting at least one sample point having height data larger than the average value, the extraction processing being executed in an entire region of the height data for one line while the start point is shifted;
   a natural defect candidate portion determination unit that executes determination processing of determining continuous sample points, included in the at least one extracted sample points, as a single natural defect candidate portion; and
   a differentiation unit that previously stores a condition characteristic of an intentional irregularity portion formed on the measurement surface, and differentiates between the intentional irregularity portion and the natural defect portion by excluding, from the natural defect candidate portion, parts of the natural defect candidate portion that satisfy the condition so as to obtain the natural defect portion,
   such that the shape sensor comprises a single light source that irradiates the tire in a spot form.

2. The data processing apparatus according to claim 1, wherein the condition characteristic of the shape of the intentional irregularity portion is at least one of conditions (1) to (7) including the condition (1) that, among the continuous sample points constituting the natural defect candidate portion, when a distance from a first sample point to a last sample point is a length of the natural defect candidate portion, if the length is a predetermined first value or smaller, the natural defect candidate portion is regarded as a harmless portion being harmless to the tire and is excluded from the natural defect candidate portion, the condition (2) that, among the continuous sample points constituting the natural defect candidate portion, when a sample point having a maximum height is a height of the natural defect candidate portion, if the height is a predetermined second value or smaller, the natural defect candidate portion is regarded as the harmless portion and is excluded from the natural defect candidate portion, the condition (3) that, among the continuous sample points constituting the natural defect candidate portion, if a height of one of the first sample point and the last sample point is larger than an average value of heights of the continuous sample points constituting the natural defect candidate portion, and if a height of the other one of the first sample point and the last sample point is smaller than the average value, the natural defect candidate portion is regarded as the intentional irregularity portion having a shape of a type other than a protruding type, an edged type, and a multiple vertices type and is excluded from the natural defect candidate portion, the condition (4) that, among the continuous sample points constituting the natural defect candidate portion, if a sum of the sample point having the maximum height and a sample point having a height of a predetermined first ratio or higher to the height of the sample point is a predetermined second ratio or higher to the continuous sample points constituting the natural defect candidate portion, the natural defect candidate portion is regarded as the intentional irregularity portion having a shape of the protruding type and is excluded from the natural defect candidate portion, the condition (5) that, among the continuous sample points constituting the natural defect candidate portion, when the sample point having the maximum height is a first sample point and previous and next sample points of the first sample point are a second sample point and a third sample point, if a difference between the height of the first sample point and a height of the second sample point and a difference between the height of the first sample point and a height of the third sample point are a predetermined third value or larger, the natural defect candidate portion is regarded as the intentional irregularity portion having a shape of the edged type or the multiple vertices type and is excluded from the natural defect candidate portion, the condition (6) that, among the continuous sample points constituting the natural defect candidate portion, if a group of continuous sample points having heights whose differences from the sample point having the maximum height are the third value or smaller includes a plurality of groups, and if a distance between the farthermost groups is a predetermined third ratio or higher to the length of the natural defect portion, the natural defect candidate portion is regarded as the intentional irregularity portion having a shape of the edged type or the multiple vertices type and is excluded from the natural defect candidate portion, and the condition (7) that, if the group includes the plurality of groups, and if a sum of variance of each of the plurality of groups is a predetermined fourth value or larger, the natural defect candidate portion is regarded as the intentional irregularity portion having a shape of the edged type or the multiple vertices type and is excluded from the natural defect candidate portion.

3. The data processing apparatus according to claim 2, wherein the condition characteristic of the shape of the intentional irregularity portion is the condition (4).

4. A data processing method that treats a tread surface or a sidewall surface of a tire as a measurement surface, and processes data indicative of a shape of the measurement surface to evaluate a natural defect portion formed on the measurement surface, the method comprising:

a measuring step of scanning the measurement surface of the tire with the shape sensor every constant sampling time period to acquire one line of measurement data, which corresponds to one round of the tire in the circumferential direction;

a height data calculation step of calculating height data for one line;

a sample point extraction step of executing extraction processing on height data for one line obtained by scanning the measurement surface with a shape sensor every constant sampling period, the extraction processing acquiring a continuous constant number of pieces of height data, started from a certain sample point as a start point, from the height data for one line, comparing each piece of the acquired height data with an average value of the acquired height data, and extracting at least one sample point having height data larger than the average value, the extraction processing being executed in an entire region of the height data for one line while the start point is shifted;

a natural defect candidate portion determination step of executing determination processing of determining continuous sample points, included in the at least one extracted sample points, as a single natural defect candidate portion; and a differentiation step of previously preparing a condition characteristic of an intentional irregularity portion formed on the measurement surface, and differentiating between the intentional irregularity portion and the natural defect portion by excluding, from the natural defect candidate portion, parts of the natural defect candidate portion that satisfy the condition so as to obtain the natural defect portion, such that the shape sensor comprises a single light source that irradiates the tire in a spot form.

* * * * *